(12) United States Patent
Fan

(10) Patent No.: US 8,749,652 B2
(45) Date of Patent: Jun. 10, 2014

(54) IMAGING MODULE HAVING PLURAL OPTICAL UNITS IN WHICH EACH OF AT LEAST TWO OPTICAL UNITS INCLUDE A POLARIZATION FILTER AND AT LEAST ONE OPTICAL UNIT INCLUDES NO POLARIZATION FILTER AND IMAGE PROCESSING METHOD AND APPARATUS THEREOF

(75) Inventor: Yingying Fan, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 13/479,060

(22) Filed: May 23, 2012

(65) Prior Publication Data

US 2012/0307132 A1 Dec. 6, 2012

(30) Foreign Application Priority Data

May 30, 2011 (JP) ................................ 2011-120563

(51) Int. Cl.
*H04N 5/225* (2006.01)
(52) U.S. Cl.
USPC ....................................... 348/218.1; 348/348

(58) Field of Classification Search
CPC ... H04N 5/23238; H04N 5/232; G06T 3/4038
USPC ....................................... 348/218.1, 335, 345
See application file for complete search history.

(56) References Cited

U.S. PATENT DOCUMENTS

| 2007/0097249 | A1* | 5/2007 | Korenaga | 348/335 |
|---|---|---|---|---|
| 2009/0284641 | A1* | 11/2009 | Hirai | 348/345 |
| 2010/0289878 | A1* | 11/2010 | Sato et al. | 348/46 |
| 2010/0289941 | A1* | 11/2010 | Ito et al. | 348/345 |
| 2012/0229628 | A1* | 9/2012 | Ishiyama et al. | 348/135 |

FOREIGN PATENT DOCUMENTS

| JP | 6265777 A | 9/1994 |
|---|---|---|
| JP | 2000112019 A | 4/2000 |
| JP | 2008157851 A | 7/2008 |
| JP | 2009253592 A | 10/2009 |
| JP | 2011085539 A | 4/2011 |

* cited by examiner

*Primary Examiner* — Gevell Selby
(74) *Attorney, Agent, or Firm* — Canon USA Inc. IP Division

(57) ABSTRACT

An imaging module includes a plurality of optical units configured to form an image of a subject. At least some of the optical units are each provided with a polarization filter. Information about a distance from the optical units to the subject is estimated based on image data acquired by the optical units provided with the polarization filters.

5 Claims, 16 Drawing Sheets

POLARIZATION FILTER: 0°
POLARIZATION FILTER: 45°
POLARIZATION FILTER: 90°

○ RANGE-FINDING OPTICAL UNIT
○ IMAGING OPTICAL UNIT

SPECULAR REFLECTION AREA
IMAGING OPTICAL UNIT
GLASS WINDOW

IMAGE CAPTURED WITHOUT POLARIZATION FILTER

GLASS WINDOW
RANGE-FINDING OPTICAL UNIT (APPROPRIATE ANGLE) IMAGE CAPTURED WITH POLARIZATION FILTER

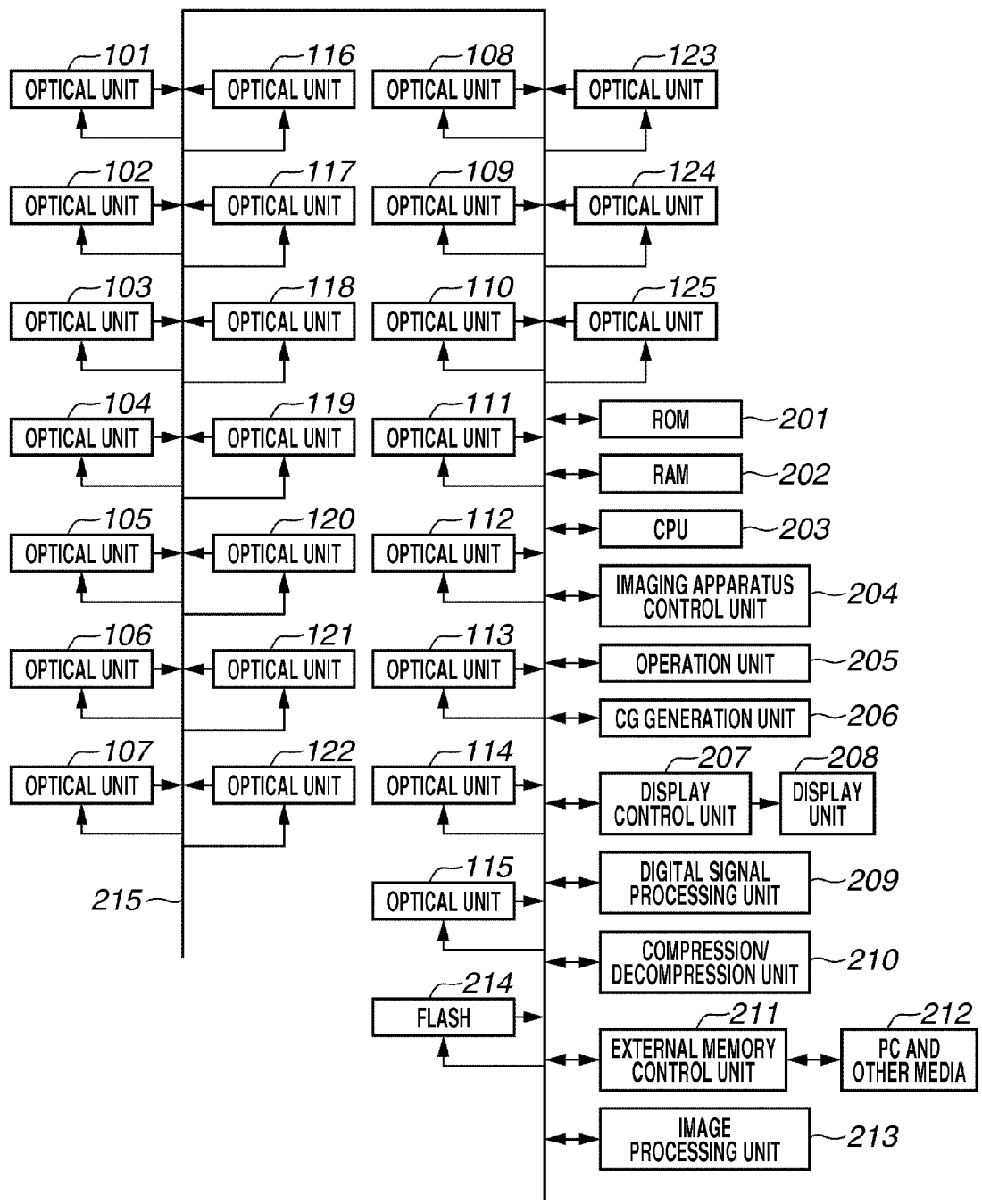

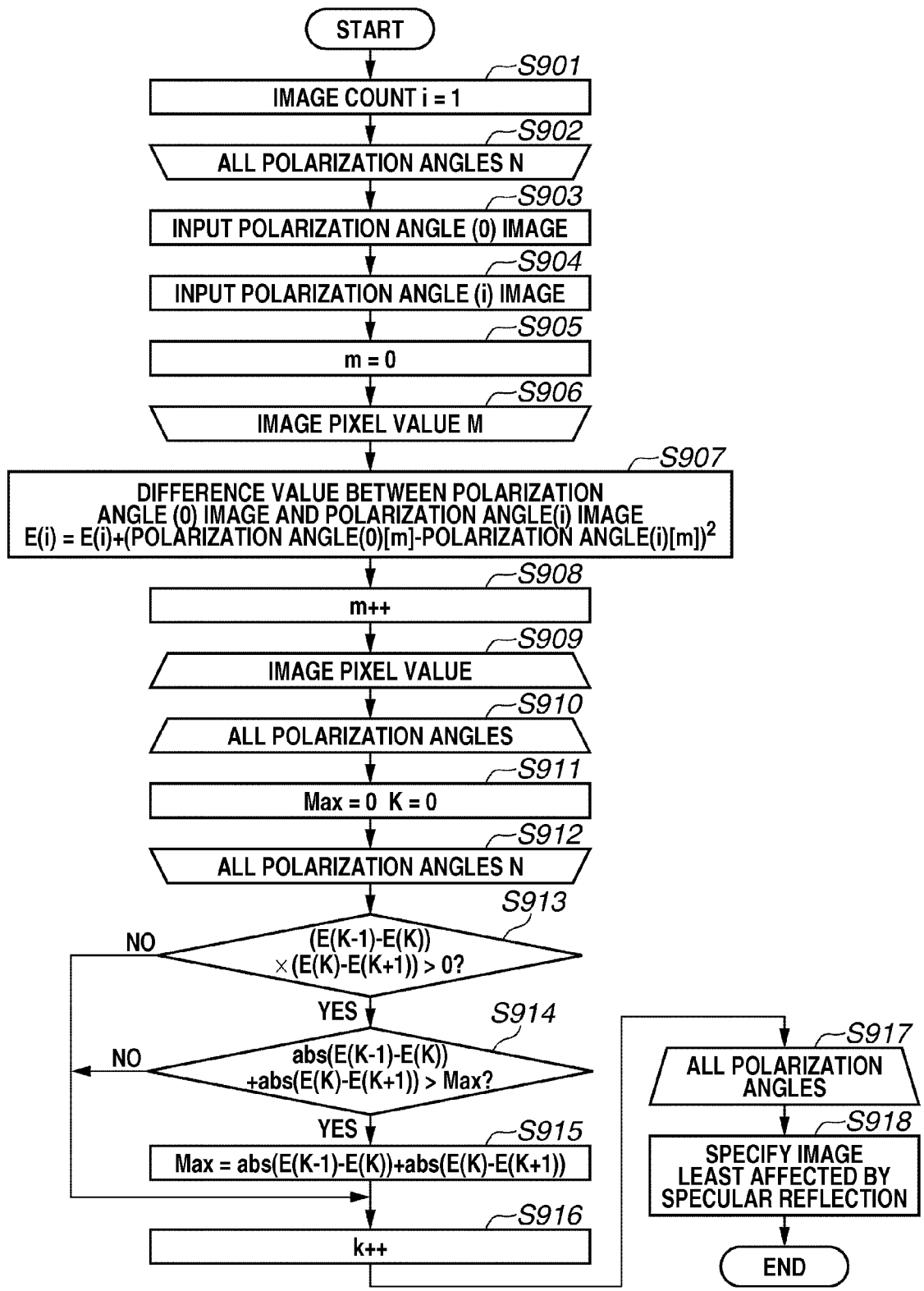

IMAGING MODULE HAVING PLURAL OPTICAL UNITS IN WHICH EACH OF AT LEAST TWO OPTICAL UNITS INCLUDE A POLARIZATION FILTER AND AT LEAST ONE OPTICAL UNIT INCLUDES NO POLARIZATION FILTER AND IMAGE PROCESSING METHOD AND APPARATUS THEREOF

BACKGROUND OF THE INVENTION

1. Field of the Invention

The present invention relates to an imaging module including a plurality of optical units.

2. Description of the Related Art

Conventionally, a technique for estimating a distance to a target object using a stereo camera or a multiple-lens imaging apparatus having multiple cameras arranged in a lattice pattern is known. Japanese Patent Application Laid-Open No. 2008-157851 discusses a technique in which a distance can be estimated by searching for corresponding points based on images having parallax obtained by a stereo camera or a multiple-lens imaging apparatus. The term "parallax" indicates the angle or semi-angle between two lines-of-sight from an imaging device to an object.

However, a distance based on images having parallax may not always be obtained appropriately due to specular reflection occurring on surfaces of glass, water, and plastic, for example. This is because reflected light from the subject cannot be properly obtained in an area having a large specular reflection component in the image.

SUMMARY OF THE INVENTION

The present invention is directed to an imaging module including a plurality of optical units which suppresses the influences of specular reflection.

According to an aspect of the present invention, an imaging module includes a plurality of optical units configured to form an image of a subject. At least some of the optical units are each provided with a polarization filter. Information about a distance from the optical units to the subject is estimated based on image data acquired by at least two optical units each provided with a polarization filter having the same polarization angle.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates the configuration of a multiple-lens imaging apparatus.

FIG. 9 is a flowchart illustrating a method for selecting an optimal range-finding image according to the first exemplary embodiment.

DESCRIPTION OF THE EMBODIMENTS

Various exemplary embodiments, features, and aspects of the invention will be described in detail below with reference to the drawings.

Figure 1A:
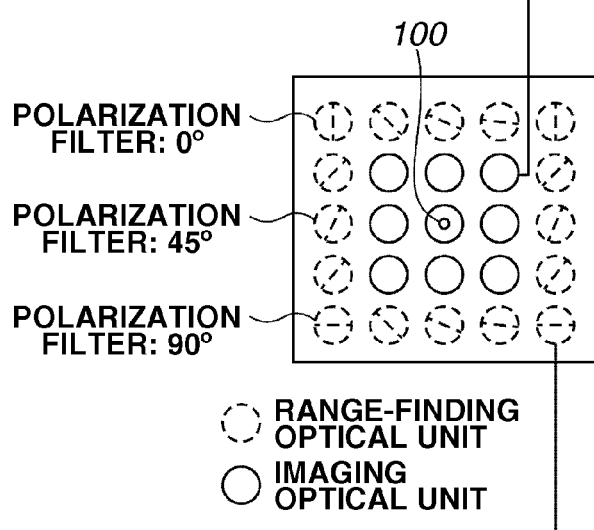
FIGS. 1A, 1B, and 1C are conceptual diagrams illustrating polarization filters mounted on a multiple-lens imaging apparatus.
Figure 1B:
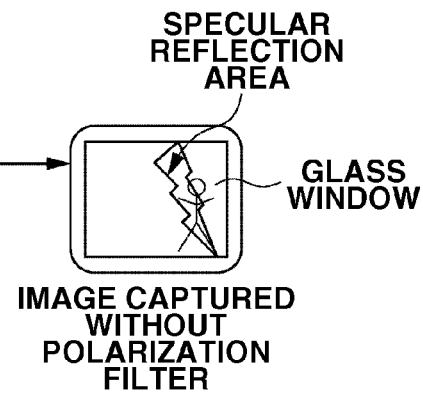
Figure 1C:
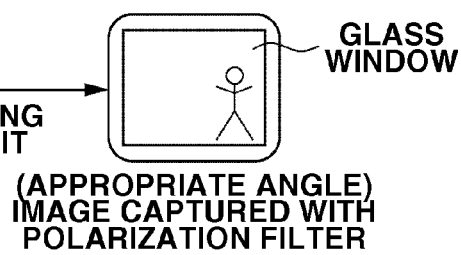

A first exemplary embodiment will be described. FIGS. 1A, 1B, and 1C are conceptual diagrams illustrating polarization filters mounted on a multiple-lens imaging apparatus. In the present exemplary embodiment, the term "multiple-lens" referrers to a system including a plurality of optical units.

FIG. 1A illustrates an example of a multiple-lens imaging apparatus constituting a plurality of optical units. Twenty five optical units are arranged in a lattice pattern of five rows and five columns. Each of the optical unit is arranged on the same plane (or substantially the same plane). The respective optical axes of the optical units are parallel (or substantially parallel) to each other, and perpendicular to the plane where the optical units are arranged.

In the present exemplary embodiment, the multiple optical units are used distinctly as range-finding optical units and as imaging optical units. In response to an imaging operation (a shutter press operation) by a user, an imaging instruction signal is sent to the plurality of optical units to acquire 25 pieces of image data simultaneously. That is, the plurality of optical units are configured to form an image of a subject when each optical unit acquires a piece of image data of the subject at the same time.

FIG. 1A illustrates an example arrangement of the range-finding optical units and the imaging optical units. In the present exemplary embodiment, as illustrated in FIG. 1A, some of the optical units, that is, the range-finding optical units, have a polarization filter mounted thereon to increase the accuracy of distance estimation.

The polarization filters mounted on the optical units suppress the influences of specular reflection light. Specular reflection light is reflected light occurring on surfaces of non-metal materials such as water, glass, or plastic. A specular reflection light component incident upon the optical units changes depending on the angle at which the polarization filter is mounted thereon. The angle at which the polarization filter is mounted on an optical unit is hereinafter referred to as a polarization angle.

When the polarization angle between the polarization filter and the plane of vibration of specular reflection component light is about 35 degrees, the light is polarized most strongly. In other words, the specular reflection component is best suppressed at a polarization angle of approximately 35 degrees. As the polarization angle between the polarization filter and the plane of vibration of specular reflection component light approaches 0 or 90 degrees, the degree of suppression of specular reflection is lowered. In other words, at a polarization angle of 0 or 90 degrees, the specular reflection component is not suppressed and becomes incident on the optical unit.

In the present exemplary embodiment, the polarization filters having a plurality of different polarization angles are mounted, and distance estimation is performed using image data captured through a polarization filter having an optimal polarization angle. Generally, in distance estimation, using a parallax image group having parallax as large as possible is suitable. A parallax image group having large parallax can be obtained from two or more optical units distant from each other. Therefore, in the present exemplary embodiment, the range-finding optical units are arranged outwardly of the imaging optical units with respect to a center 100 of the optical unit group (imaging module) illustrated in FIG. 1A. The above arrangement enables images with larger parallax to be acquired.

In FIG. 1A, a line segment (diameter) passing through the center of each range-finding optical unit indicates the polarization angle of the polarization filter. FIGS. 1B and 1C are conceptual diagrams illustrating captured-image data obtained when images of a subject (a person who is on the other side of a glass window) are captured by different optical units through the glass window. FIG. 1B is a conceptual diagram illustrating a captured image obtained by an imaging optical unit without a polarization filter. FIG. 1C is a conceptual diagram illustrating a range-finding image obtained by a range-finding optical unit with a polarization filter mounted thereon. In FIG. 1B, the captured image has a "specular reflection area" thereon due to a specular reflection light component. The specular reflection area is caused by light reflected off the glass window. In contrast, in FIG. 1C, the polarization filter has removed or at least minimized the specular reflection area on the range-finding image. Thus, allowing the range-finding image of the subject acquired through the glass to appear without specular reflection.

FIG. 2 illustrates a block diagram configuration of a multiple-lens imaging apparatus. An example of a multiple-lens imaging apparatus is a stereoscopic endoscope capable of capturing a plurality of parallax images (images obtained from slightly different angles) and fusing the captured images to create stereoscopic (three-dimensional) display of an image. A multiple-lens imaging apparatus is not limited to this example.

In FIG. 2, optical units 101 to 125 receive incoming light from a subject with an imaging sensor, perform A/D conversion on the received light, and output digital data to a bus 215, which is a data transfer path. In the present exemplary embodiment, each of the optical units 101 to 125 functions as either an imaging optical unit or a range-finding optical unit. It should be noted that an imaging optical unit and a range-finding optical unit are substantially similar optical units in structure and imaging function, as described in reference to FIG. 3. In the present embodiment, a main difference between these optical units is that a range-finding optical unit is provided with a polarization filter, whereas an imaging optical unit is provided without a polarization filter.

Figure 3:
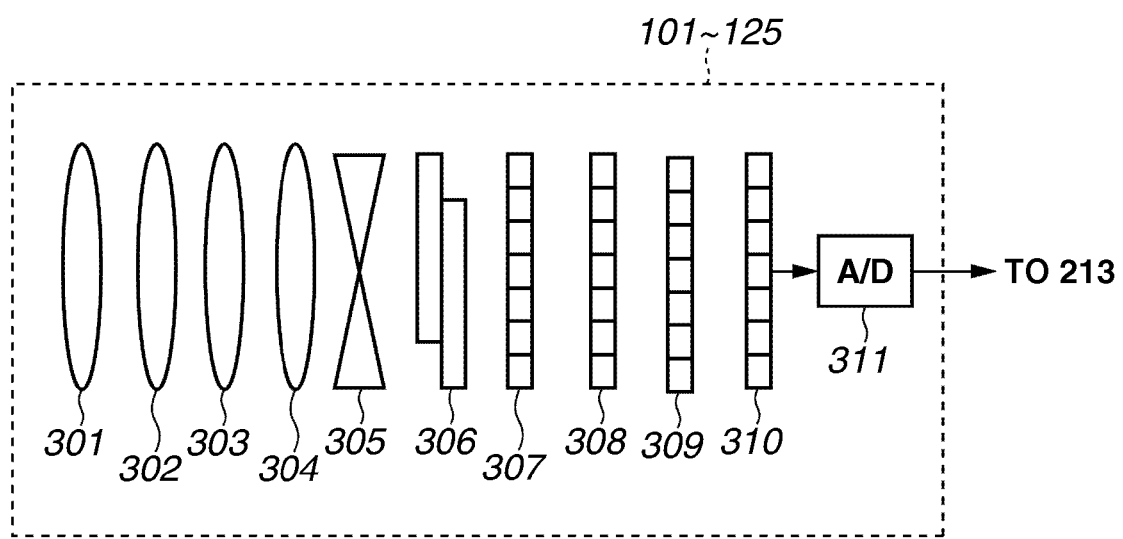
FIG. 3 illustrates an optical unit.

With reference to FIG. 3, the optical units 101 to 125 will be described in detail. Of the optical units 101 to 125, those that function as range-finding optical units are each provided with a polarization filter 301. On the other hand, of the optical units 101 to 125, those that function as imaging optical units are provided without the polarization filter 301. Each of the optical units 101 to 125 includes a zoom lens 302, a focus lens 303, a blur correction lens 304, an aperture 305, a shutter 306, an optical low-pass filter 307, an IR cut filter 308, and a color filter 309, for example. The optical units 101 to 125 detect light from a subject, obtained through the lenses and the filters, with a sensor 310 such as a complementary metal oxide semiconductor (CMOS) device or a charge-coupled device (CCD). An A/D conversion unit 311 converts the amount of light from the subject to a digital value (image data).

Flash 214 illuminates the subject with light. A digital signal processing unit 209 performs, for example, white balance processing, gamma processing, and noise reduction processing on the digital value to generate a digital image.

A compression/decompression unit 210 performs processing for converting the digital value into a file format, such as a Joint Photographic Experts Group (JPEG) format or a Motion Picture Experts Group (MPEG) format.

An external memory control unit 211 is an interface for establishing connection with a PC and other media 212 (for example, a hard disk, a memory card, a Compact Flash (CF) card, a Secure Digital (SD) card, and an Universal Serial Bus (USB) memory).

A central processing unit (CPU) 203, which is responsible for processing in each component, sequentially reads and interprets instructions in programs stored in a read only memory (ROM) 201 and a random access memory (RAM) 202, to execute processing according to the results of the interpretations. The ROM 201 and the RAM 202 provide the CPU 203 with programs, data, work areas, and the like required for the processing.

An imaging apparatus control unit 204 controls the imaging system as instructed by the CPU 203. For example, the imaging apparatus control unit 204 adjusts focus, opens the shutter, and adjusts the aperture.

Buttons and a mode dial correspond to an operation unit 205, and user instructions input by a user are received via the buttons and the mode dial. A computer graphics (CG) generation unit 206 generates characters, graphics, and the like.

A liquid crystal display (LCD) is commonly used as a display unit 208. The display unit 208 displays captured images and characters received from the CG generation unit 206, the digital signal processing unit 209, and an image processing unit 213, which will be described later. The display unit 208 may have a touch screen function. In that case, user instructions can be treated as an input unit of the operation unit 205.

The image processing unit 213 performs various kinds of image processing using digital image data obtained from the optical units 101 to 125 and the external memory control unit 211, and outputs the results of the processing to the bus 215.

The apparatus includes components other than those described above. However, those other components do not constitute a principal part of the present exemplary embodiment, and thus will not be described herein.

Figure 4:
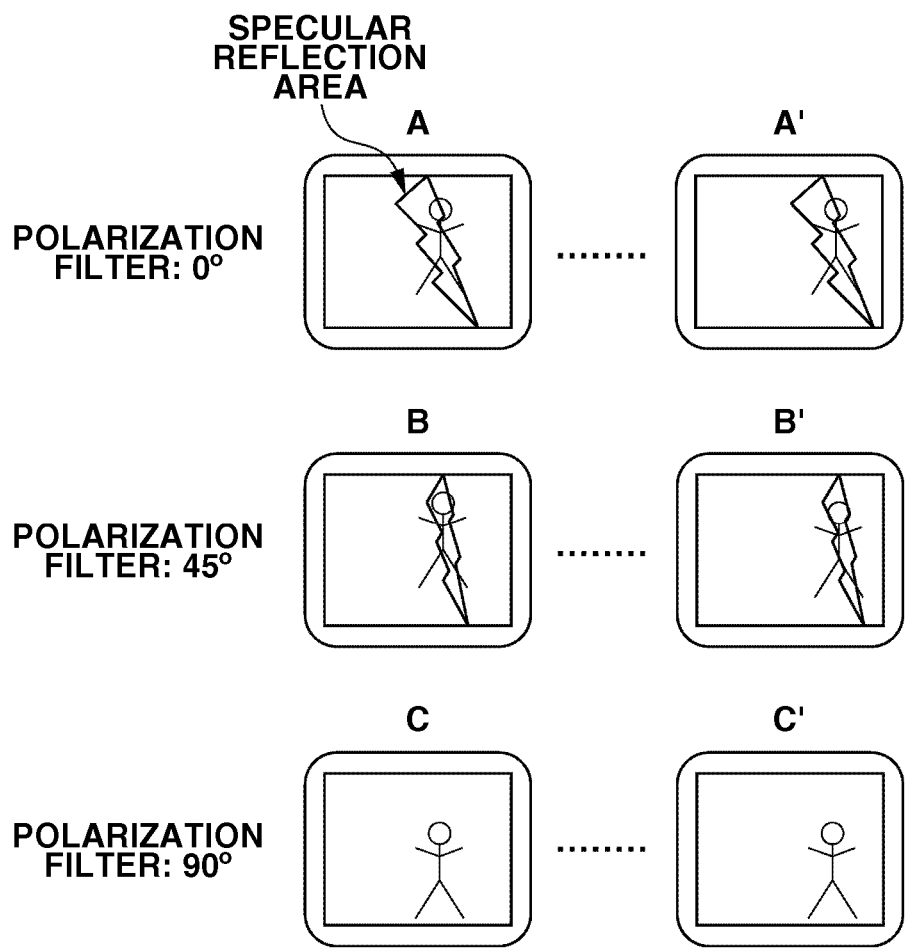
FIG. 4 is a conceptual diagram illustrating image data obtained through polarization filters mounted at different polarization angles.

FIG. 4 is a conceptual diagram illustrating image data obtained through polarization filters mounted at different polarization angles. The polarization angle is an angle formed by a polarization filter with respect to a predetermined reference plane (which is the horizontal in the present exemplary embodiment).

FIG. 4 illustrates a group of range-finding images A and A' captured by a set of range-finding optical units each having a polarization filter mounted at a polarization angle of 0 degrees. The range-finding images A and A' are each captured by the different optical units respectively. FIG. 4 also illustrates a group of range-finding images B and B' captured by range-finding optical units each having a polarization filter mounted at a polarization angle of 45 degrees. FIG. 4 also illustrates a group of range-finding images C and C' captured by range-finding optical units each having a polarization filter mounted at a polarization angle of 90 degrees. The size of a specular reflection area and the intensity of a specular reflection light component appearing on the images change with changes in the polarization angle of the polarization filter. When a polarization angle becomes optimal, the specular reflection component is removed substantially. In the example illustrated in FIG. 4, when the polarization angle is 90 degrees, the specular reflection component is substantially removed.

Figure 5:
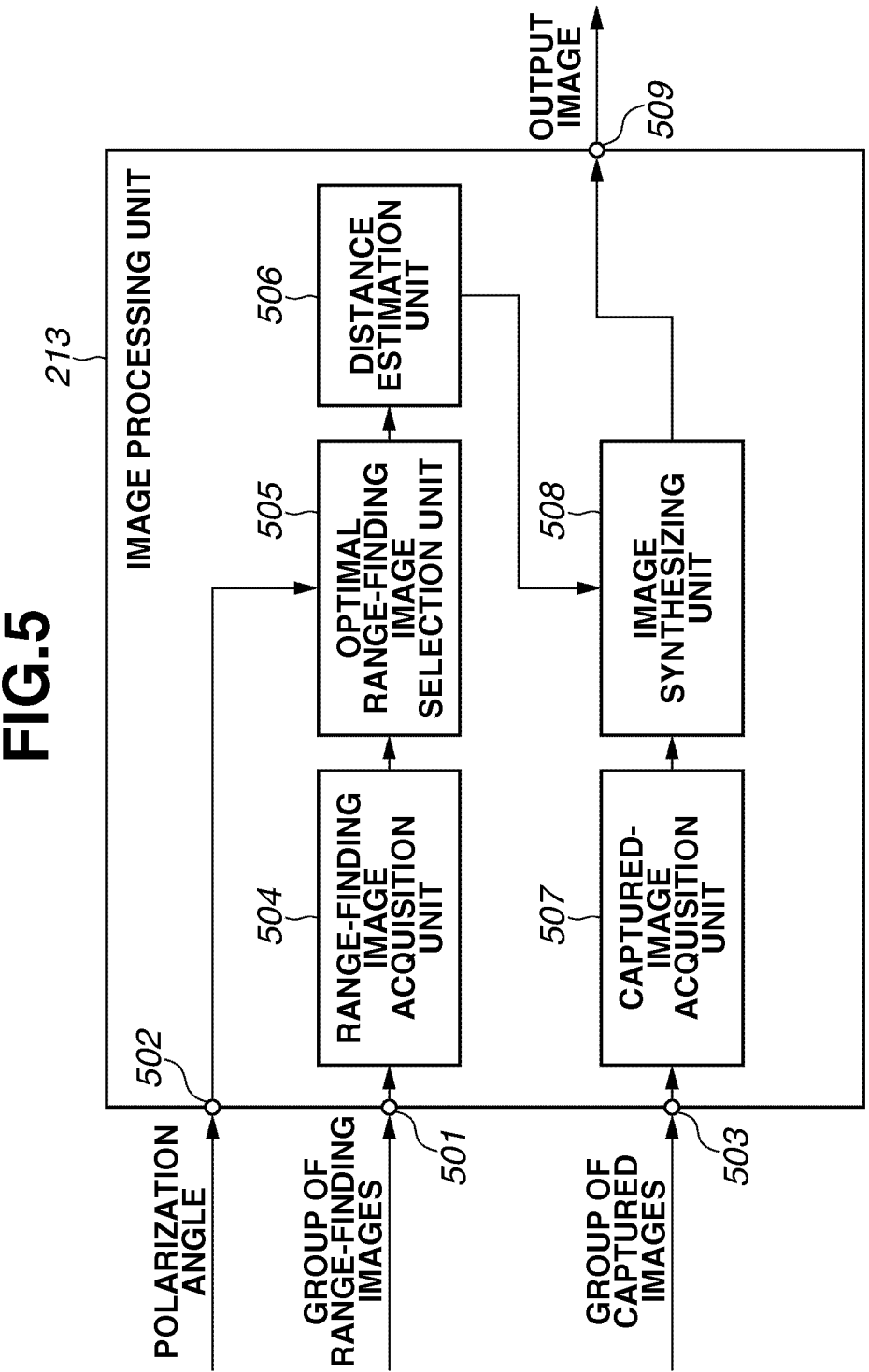
FIG. 5 is a block diagram illustrating an image processing unit according to a first exemplary embodiment.

FIG. 5 is a block diagram illustrating the image processing unit 213 according to the present exemplary embodiment. An input terminal 501 inputs to the image processing unit 213 a group of range-finding image data captured by the range-finding optical units provided with the polarization filters. An input terminal 502 inputs, to the image processing unit 213, information about the polarization angles (polarization angle information) corresponding to the respective input range-finding image data. An input terminal 503 inputs normal captured-image data (or a group of normal captured-image data) captured by the optical units to the image processing unit 213.

Figure 7:
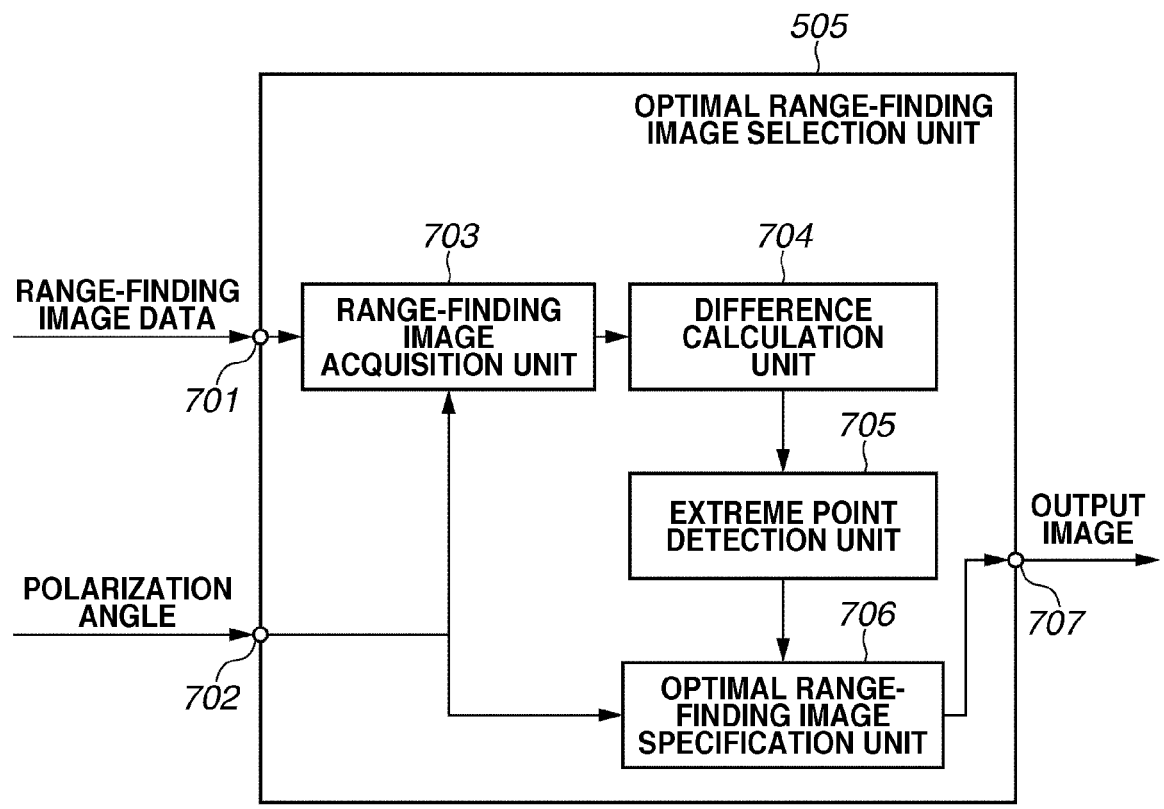
FIG. 7 is a block diagram illustrating an optimal range-finding image selection unit according to the first exemplary embodiment.

A range-finding image acquiring unit 504 reads as range-finding images the range-finding image data input from the input terminal 501. A captured-image acquiring unit 507 reads as captured images the captured-image data (or the group of captured-image data) input from the input terminal 503. The acquired range-finding images are input to an optimal range-finding image selection unit 505. The optimal range-finding image selection unit 505 selects image data less affected by specular reflection caused, for example, by glass as range-finding image data. The selection method will be described later with reference to a block diagram in FIG. 7 illustrating the optimal range-finding image selection unit 505. A distance estimation unit 506 performs distance estimation using the image data (the optimal range-finding image data) least affected by specular reflection. The distance estimation is performed using, for example, a stereo method which will be described later.

An image synthesizing unit 508 synthesizes the plurality of captured-image data obtained by the captured-image acquiring unit 507 by using information about the distance estimated by the distance estimation unit 506. Examples of the image synthesis using the plurality of image data include: (1) processing in which the plurality of image data is shifted and synthesized using the distance data of the imaged object, to thereby generate a blurred image; and (2) super-resolution processing performed by carrying out an iterative operation. The synthesized image data (the blurred image data or the data resulting from super-resolution processing) synthesized by the image synthesizing unit 508 is output from an output terminal 509.

Figure 6:
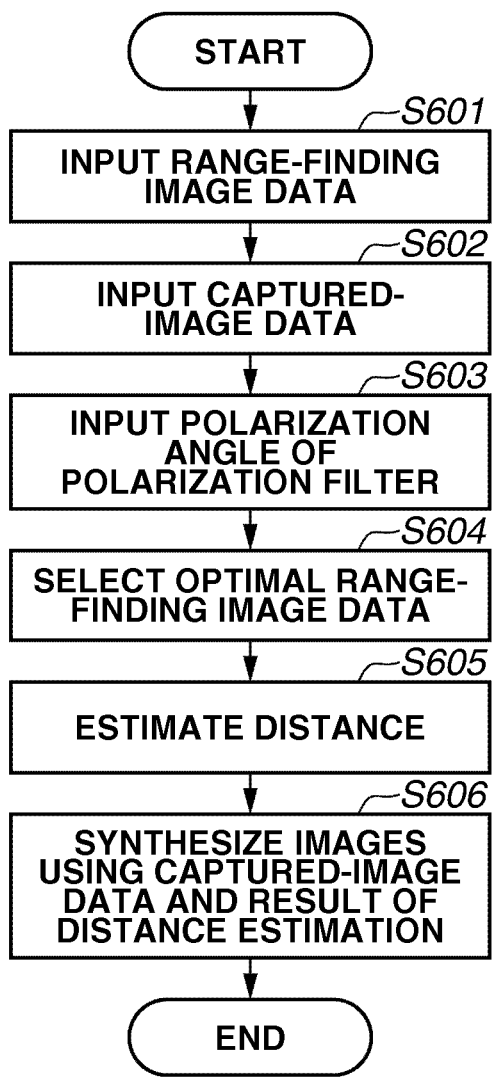
FIG. 6 is a flowchart illustrating an image processing method according to the first exemplary embodiment.

FIG. 6 is a flowchart illustrating an image processing method according to the first exemplary embodiment. In FIG. 6, in step S601, range-finding image data is input. In step S602, captured-image data is input. In step S603, the polarization angles of polarization filters corresponding to the range-finding image data input in step S601 are input. In step S604, the optimal range-finding image selection unit 505 selects range-finding image data that contains a minimized specular reflection light component, as optimal range-finding image data, from among the range-finding image data input in step S601. In step S605, the distance estimation unit 506 performs distance estimation using the optimal range-finding image data selected in step S604. In step S606, the image synthesizing unit 508 performs image synthesis processing on the plurality of captured-image data using the result of the distance estimation.

FIG. 7 is a block diagram illustrating the optimal range-finding image selection unit 505 according to the present exemplary embodiment. The optimal range-finding image selection unit 505 acquires image data least affected by specular reflection due, for example, to glass, and obtained by at least two optical units having a polarization filter of the same polarization angle.

Range-finding image data is input to a range-finding image acquisition unit 703 from an input terminal 701. The way in which a specular reflection area appears on each image changes with changes in the angle (the polarization angle) of the polarization filter. For the part other than the specular reflection area, brightness differs to some degree between images, but the brightness difference is smaller than that for the specular reflection area.

A difference calculation unit 704 calculates the sum of difference values between pixels in range-finding image data obtained through a polarization filter having a predetermined polarization angle (a reference polarization angle) and corresponding pixels in range-finding image data obtained through a polarization filter having a polarization angle $k\alpha$, where $\alpha$ represents a unit polarization angle, and k represents a natural number. As the polarization angle difference between the two pieces of range-finding image data increases, the way in which a specular reflection area appears on the range-finding images changes greatly, and thus the sum of difference values between the corresponding pixels in the two range-finding images increases.

An extreme point detection unit 705 compares the sums of difference values in the order of polarization angles. The extreme point detection unit 705 detects a point at which the sum of difference values changes sign (that is, a point at which a first derivative value of the function connecting the sums of difference values is 0 or close to 0) as an extreme point.

An optimal range-finding image specification unit 706 selects range-finding image data captured at the polarization angle corresponding to the extreme point as range-finding image data (the optimal range-finding image data) least affected by specular reflection.

Figure 8A:
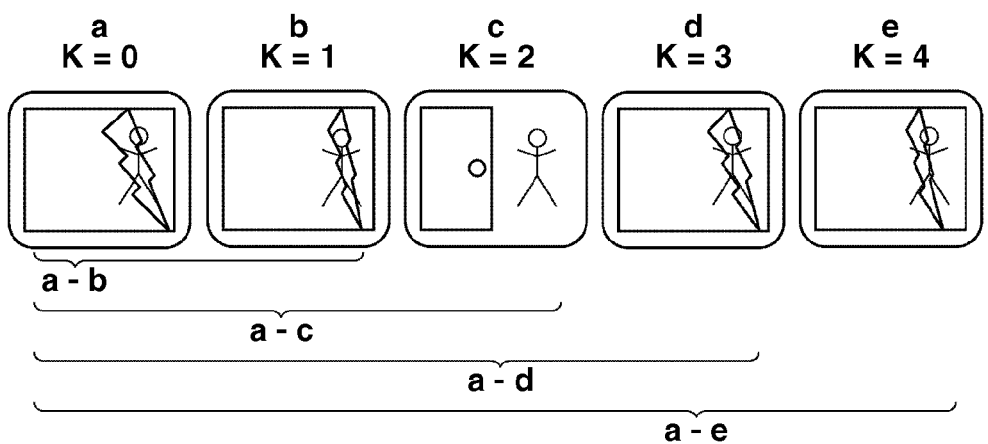
FIGS. 8A and B illustrate differences among images according to the first exemplary embodiment.

FIGS. 8A and B are conceptual diagrams illustrating a method for selecting optimal range-finding image data according to the present exemplary embodiment.

Any specular reflection area appearing on an image obtained using a range-finding optical unit has high intensity. When a polarization filter is mounted, such a high intensity area changes depending on the mounting angle of the polarization filter. An image having a minimized high-intensity area is detected from all images captured through polarization filters mounted at different angles. The mounting angle of the polarization filter through which the detected image was captured is considered to be effective to suppress specular reflection.

Figure 8B:
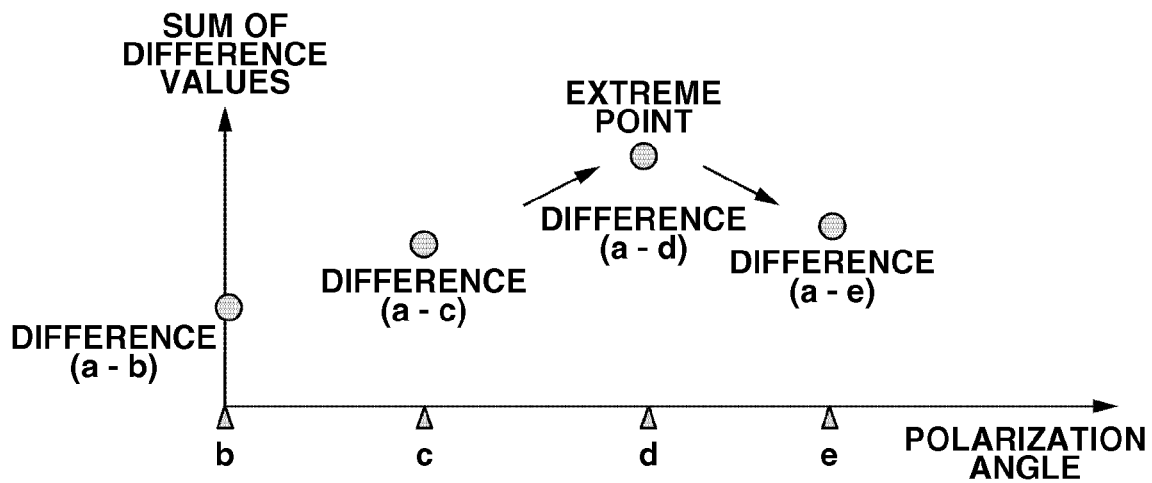

FIG. 8A illustrates images a, b, c, d, and e, which are indicated by image data obtained by multiple optical units having different polarization angles. The images a, b, c, d, and e correspond to image data obtained through polarization filters having the different polarization angles (0°, α°, 2α°, 3α°, 4α°, respectively). In FIG. 8B, the vertical axis indicates the sum of difference values between the reference image a and each of the images b, c, d, and e. The sum of difference values in the first exemplary embodiment is the sum of difference values between corresponding pixels in two images. The horizontal axis corresponds to the polarization angle of the polarization filter. A specular reflection component is reduced on an image indicated by image data obtained through a polarization filter having an appropriate polarization angle. As can be seen from FIG. 8A, the point (the extreme point) at which the sum of difference values changes from monotone increasing to monotone decreasing indicates the optimal polarization angle. A detailed calculation method will be described with reference to a flowchart illustrated in FIG. 9.

FIG. 9 is a flowchart illustrating a method for selecting optimal range-finding image data according to the present exemplary embodiment. In step S901, an image count is initialized. For all polarization angles, processing in steps S902 to S910 is repeated. In the present exemplary embodiment, two pieces of range-finding image data are provided for each polarization angle. Thus, for N (N different) polarization angles, for example, 2N pieces of range-finding image data are provided. In the present exemplary embodiment, when the processing in steps S902 to S910 is repeated, only one of each pair (two pieces) of range-finding image data is used.

The count of input range-finding image data is from 0 to N-1. In the present exemplary embodiment, the 0th range-finding image data is indicated as polarization angle (0) image data. In step S903, the polarization angle (0) image data is input. In step S904, polarization angle (i) image data is input, where i indicates a natural number. In step S905, a counter m, which counts the number of pixels in range-finding image data, is initialized. Processing in steps S906 to S909 forms a loop for obtaining difference values for all pixels in the range-finding image. In step S907, the sum of difference values between the polarization angle (0) image and the polarization angle (i) image in the location indicated by the counter m is calculated and added to an integrated value E(i). In the present exemplary embodiment, the sum of squares of difference values is added to the integrated value E(i) to eliminate the effects of signs.

In step S908, the counter m is incremented by one. After completion of step S909, the integrated value E(i) becomes the sum (the sum of squares) of difference values between the polarization angle (0) image and the polarization angle (i) image.

In step S911, values k and Max are initialized. The value Max is a variable for recording the value of an extreme point. The value k is a variable for counting the polarization angle. Processing in steps S912 to S917 forms a calculation loop for specifying the extreme point. In step S913, (1) the difference between the kth sum of difference values and the (k−1)th sum of difference values is multiplied by (2) the difference between the kth sum of difference values and the (k+1)th sum of difference values. If the multiplication result is greater than 0 (YES in step S913), the three points k−1, k, and k+1 monotonously increase or decrease, and the process proceeds to step S914. If the multiplication result is equal to or less than 0 (NO in step S913), k is the extreme point and the process proceeds to step S916.

In step S914, the absolute value of the amount of change in the three points k−1, k, and k+1 is compared with Max. If the absolute value is greater than Max (YES in step S914), the process proceeds to step S915 where the value of Max is updated. If the absolute value is less than Max (NO in step S914), the process proceeds to step S916 without updating the value of Max. In step S917, when processing is complete for all polarization angles, the polarization angle k corresponding to the maximum value of the extreme point is output. In step S918, range-finding image data corresponding to the polarization angle k corresponding to the maximum value of the extreme point is specified. The specified range-finding image data is the optimal range-finding image data least affected by specular reflection. The method for obtaining the extreme point is not limited to that described above.

As set forth above, according to the present exemplary embodiment, the imaging apparatus including multiple optical units has polarization filters mounted on at least some of the optical units. In this way, range-finding image data least affected by specular reflection can be acquired, enabling image processing, such as distance estimation, to be performed with higher precision.

Modified examples of the present exemplary embodiment will be described. The imaging apparatus described in the present exemplary embodiment includes the multiple optical units (the range-finding optical units and the imaging optical units). However, the imaging apparatus may include imaging modules. Such imaging modules do not need to include the operation unit 205, the external memory control unit 211, and the like. An imaging module may include at least a minimum number of optical units (the range-finding optical units and the imaging optical units) sufficient to form an image of a subject, and to obtain information about a distance from the optical units to the subject, where the distance can be estimated based on image data acquired by at least two optical units each provided with a polarization filter having the same polarization angle. In the present exemplary embodiment, the imaging optical units are not provided with a polarization filter. However, imaging optical units each having a polarization filter mounted thereon may acquire captured-image data. In that case, image synthesis processing is performed on the captured-image data less affected by specular reflection.

In the present exemplary embodiment, after the distance estimation, the captured-image data is synthesized by image processing, for example. However, the image processing is not limited to this. For example, super-resolution processing, or processing for adding blurring by setting a desired focus distance may be performed after the distance estimation.

In the present exemplary embodiment, the polarization angles are fixed. However, the apparatus may include a mechanism that allows a user to set any polarization angle. In that case, while checking the degree of reflection, the user sets a polarization angle that minimizes the reflection. This reduces the number of pieces of range-finding image data captured uselessly (in other words, range-finding image data captured at non-optimal polarization angles) in the present exemplary embodiment. Also, an actuator, for example, may be provided to automatically adjust the polarization angle.

In the present exemplary embodiment, distance estimation is performed based on at least two range-finding images. However, two or more pairs of range-finding images may be used to perform distance estimation. In a case where the number of available range-finding optical units is limited, as the number of range-finding images is increased, the accuracy of distance estimation increases, while the number of different polarization angles decreases.

In the present exemplary embodiment, the image processing illustrated in FIG. 6 is performed within the imaging apparatus, but is not limited to this. For example, the various kinds of processing performed by the image processing unit 213 may be performed by an image processing apparatus other than the imaging apparatus.

Figure 10:
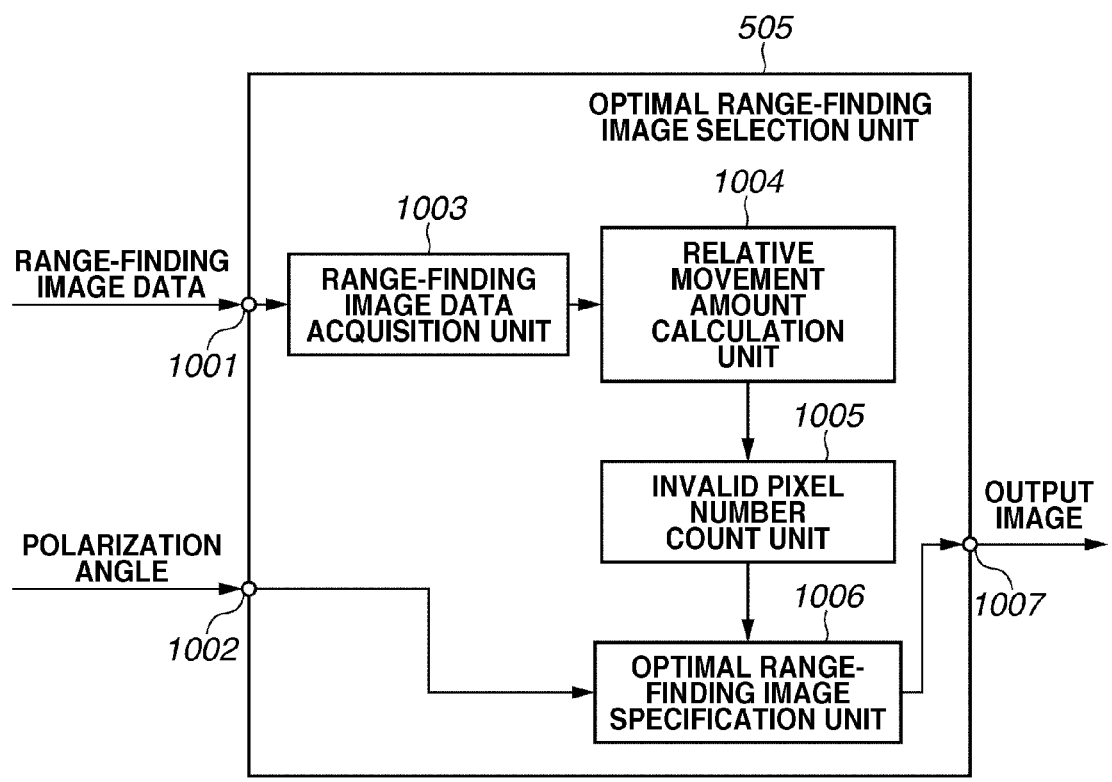
FIG. 10 illustrates an optimal range-finding image selection unit according to a second exemplary embodiment.

A second embodiment will be described. FIG. 10 is a block diagram illustrating an optimal range-finding image selection unit 505 according to the present exemplary embodiment. A group of range-finding image data is input to a range-finding image data acquiring unit 1003 from an input terminal 1001. A relative movement amount calculation unit 1004 calculates the amount of relative movement between pieces of range-finding image data captured through polarization filters having the same polarization angle. In block matching performed to calculate the amount of relative movement, a specular reflection area, which is flat, is determined as an invalid block (a block constituted by invalid pixels). An invalid pixel number counting unit 1005 counts the number of invalid pixels. An optimal range-finding image specification unit 1006 specifies, as optimal range-finding image data, an image that contains a minimum number of invalid pixels by using the results of counting the number of invalid pixels for all polarization angles. The specified optimal range-finding image data is output from an output terminal 1007.

Figure 11:
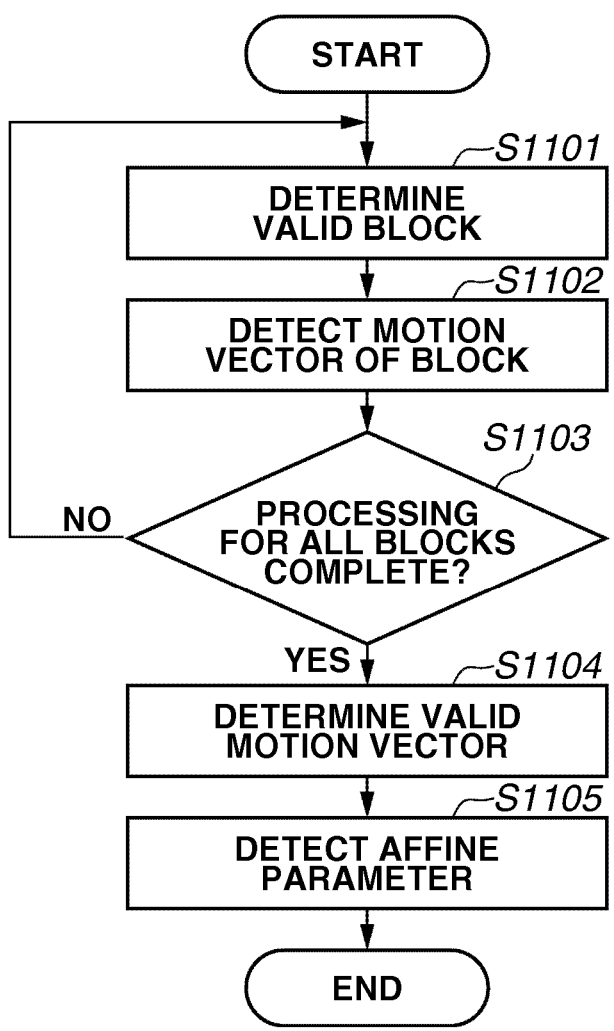
FIG. 11 is a flowchart illustrating calculation of the amount of relative movement.

FIG. 11 is a flowchart illustrating a method for calculating the amount of relative movement between images. A method will be described below in which a motion vector is obtained for each block, and the amount of movement in the entire screen is obtained as affine parameters from the motion vectors. Before obtaining the respective motion vectors for the blocks, in step S1101, valid block determination is performed as pre-processing. This processing is performed to remove each block for which a correct motion vector may not be obtained. The processing will be described in detail later. In step S1102, the motion vector of each block is calculated. A general block matching method will be described below. In a block matching method, the sum of squared differences or the sum of absolute differences between pixels in blocks is used as an evaluation value of matching. Evaluation values are obtained while sequentially moving a target block for which a vector is calculated, within a search area of a reference image.

The location having a minimum evaluation value from among all evaluation values calculated within the search area is a location having the highest correlation with the target block, and the amount of movement of that location is the motion vector. A method in which evaluation values are obtained pixel by pixel in a search area is called a full search. In contrast, in a method called a step search, a minimum evaluation value is obtained by thinning out the search area, and then a fine search is performed in the vicinity of the location having the minimum evaluation value. The step search is well known as a method to calculate the motion-vector fast. Next, in step S1104, valid motion vector determination is performed. The processing is performed to exclude each motion vector that is determined that the result of calculation is not right, from among the obtained motion vectors. The processing will be described in detail later. In step S1103, a determination is made whether processing for all blocks is complete. If processing for all blocks is complete (YES in step S1103), then in step S1105, affine parameters are detected from the valid motion vectors.

The affine parameter detection will be described in detail below. If the central coordinates of a target block are (x, y), and the result of motion vector calculation indicates that the central coordinates of a block in a reference image have moved to (x', y'), then the relationship between these coordinates can be expressed by equation (1).

$$\begin{pmatrix} x' \\ y' \\ 1 \end{pmatrix} = \begin{pmatrix} a & b & c \\ d & e & f \\ 0 & 0 & 1 \end{pmatrix} \cdot \begin{pmatrix} x \\ y \\ 1 \end{pmatrix} \quad (1)$$

In the equation (1), the 3×3 matrix is an affine transformation matrix. Each element in the matrix is an affine parameter. When a=1, b=0, d=0, and e=1, this transformation is a translational movement where c represents the amount of horizontal movement, and f represents the amount of vertical movement. A rotational movement by a rotational angle θ can be expressed as a=cos θ, b=−sin θ, d=sin θ, and e=cos θ. Based on the foregoing, x' of Equation (1) can be expressed in a generalized matrix form as in Equation(2).

$$x'=Ax \quad (2)$$

where x and x' represent 1×3 matrices, and A represents a 3×3 matrix.

If there are n valid motion vectors, the coordinate values of the target image can be expressed as an n×3 matrix as in equation (3).

$$x=(x_1\ x_2 \ldots x_n) \quad (3)$$

Similarly, the coordinate values after the movement can be expressed as an n×3 matrix as in equation (4).

$$x'=(x'_1\ x'_2 \ldots x'_n) \quad (4)$$

Therefore, for n motion vectors, the expression given by equation (5) is obtained.

$$X'=AX \quad (5)$$

In other words, the affine matrix A obtained by equation (5) represents the amount of displacement in the entire screen. If equation (5) is modified, then the affine matrix A is calculated as in equation (6).

$$A=X' \cdot X^T \cdot (X \cdot X)^{T-1} \quad (6)$$

In this approach, to calculate the amount of relative movement between blocks by performing block matching, the images in the blocks need to have some feature quantity. For a flat block that includes substantially only a direct-current component, a correct motion vector cannot be obtained. Conversely, for a block that includes an edge in the horizontal and vertical directions, matching is likely to be performed easily.

Figure 12:
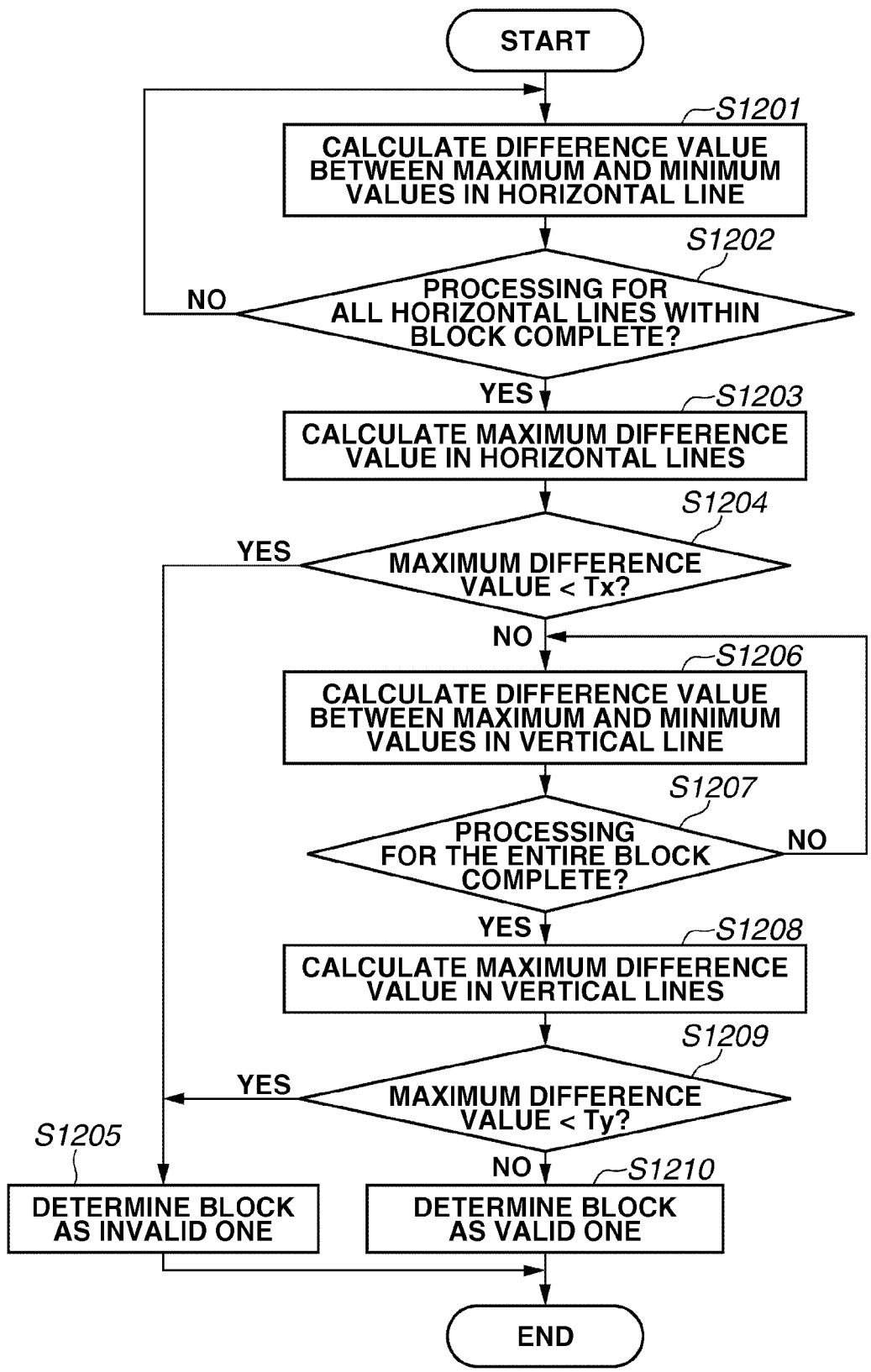
FIG. 12 is a flowchart illustrating determination of a valid block and an invalid block.

FIG. 12 illustrates a technique for excluding such flat blocks. Processing for a single block will be described here. First, in step S1201, a difference value between a maximum value and a minimum value is calculated for one horizontal line within a block. For example, if a block is constituted by 50×50 pixels, a maximum value and a minimum value are obtained from the 50 pixels in the horizontal direction within the block to calculate the difference value therebetween. This operation is repeatedly performed for the number of horizontal lines, in other words, 50 times. In step S1203, a maximum difference value is determined from the 50 difference values. In step S1204, the maximum difference value is compared with a predetermined threshold Tx. If the maximum difference value is less than the threshold Tx (YES in step S1204), the block is determined to have no feature quantity in the horizontal direction. In step S1205, the block is determined to be an invalid block.

If the block is determined to have a feature quantity in the horizontal direction (NO in step S1204), a similar verification operation is performed in the vertical direction. First, in step S1206, a difference value between a maximum value and a minimum value is calculated for one vertical line within the block. Specifically, the maximum and minimum values are obtained from the 50 pixels in the vertical direction within the block to calculate the difference value therebetween. This operation is repeatedly performed for the number of vertical lines, in other words, 50 times. Then, in step S1208, a maximum difference value is determined from the 50 difference values. In step S1209, the maximum difference value is compared with a predetermined threshold Ty. If the maximum difference value is less than the threshold value Ty (YES in step S1209), the block is determined to have no feature quantity in the vertical direction. In step S1205, the block is determined to be an invalid block. If the block has features in both the horizontal and vertical directions (NO in step S1209), block matching can be expected to be performed accurately. Thus, in step S1210, the block is determined to be a valid block.

Figure 13:
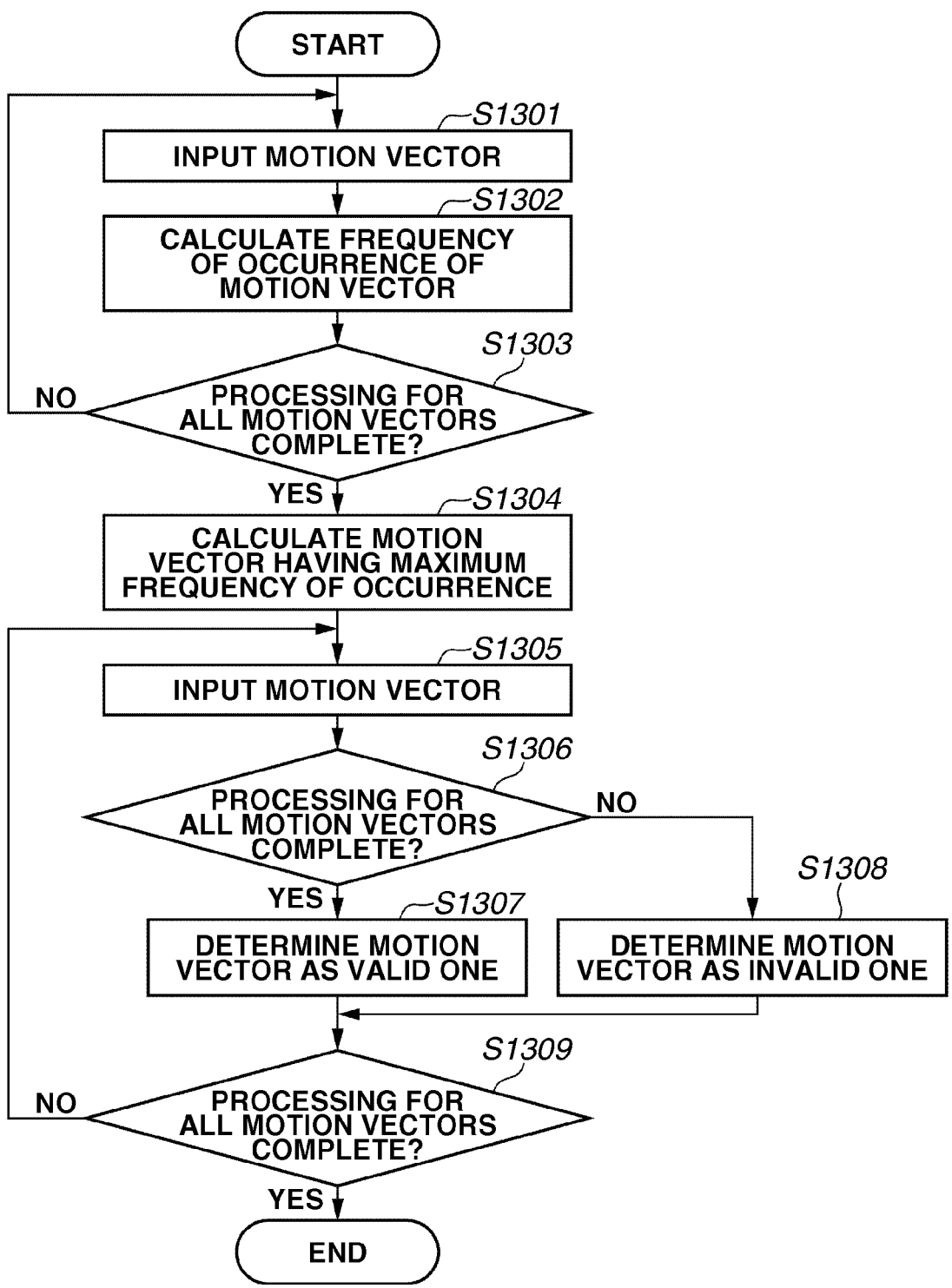
FIG. 13 is a flowchart illustrating determination of a valid motion vector and an invalid motion vector.

A method for determining a valid motion vector will be described below with reference to a flowchart illustrated in FIG. 13. First, in step S1301, a motion vector is input. Instep S1302, the frequency of occurrence of the motion vector is calculated. In step S1303, the processing is repeatedly performed until the occurrence frequencies of all motion vectors are obtained. Upon completion of the processing (YES in step S1303), in step S1304, a motion vector having the maximum frequency of occurrence is determined. Then, in step S1305, a motion vector is input again. In step S1306, a determination is made whether this motion vector is the motion vector having the maximum occurrence frequency or a motion vector in the vicinity thereof. When blurring in the entire screen is only shift blurring, the motion vector of each block should substantially match the motion vector having the maximum occurrence frequency. If blurring due to rolling is included, many motion vectors presumably occur in the vicinity of the motion vector having the maximum occurrence frequency. Therefore, in step S1307, motion vectors that fall within the range of these values are determined to be valid motion vectors. In step S1308, motion vectors that fall outside the range of these values are determined to be invalid motion vectors. In step S1309, a determination is made whether the processing is complete for all motion vectors. The series of processes from step S1305 is repeatedly performed until the processing is complete for all motion vectors.

As described above, the group of images (the optimal range-finding image data) least affected by specular reflection can be found by counting the number of invalid blocks (or the number of invalid pixels) in the alignment between images used in distance estimation. This is achieved by utilizing a feature which is the fact that a correlation between images is difficult to find in a specular reflection area. In the present exemplary embodiment, the result of distance estimation in which the effects of specular reflection are minimized can be obtained based on the optimal range-finding image data selected in this manner.

Figure 14:
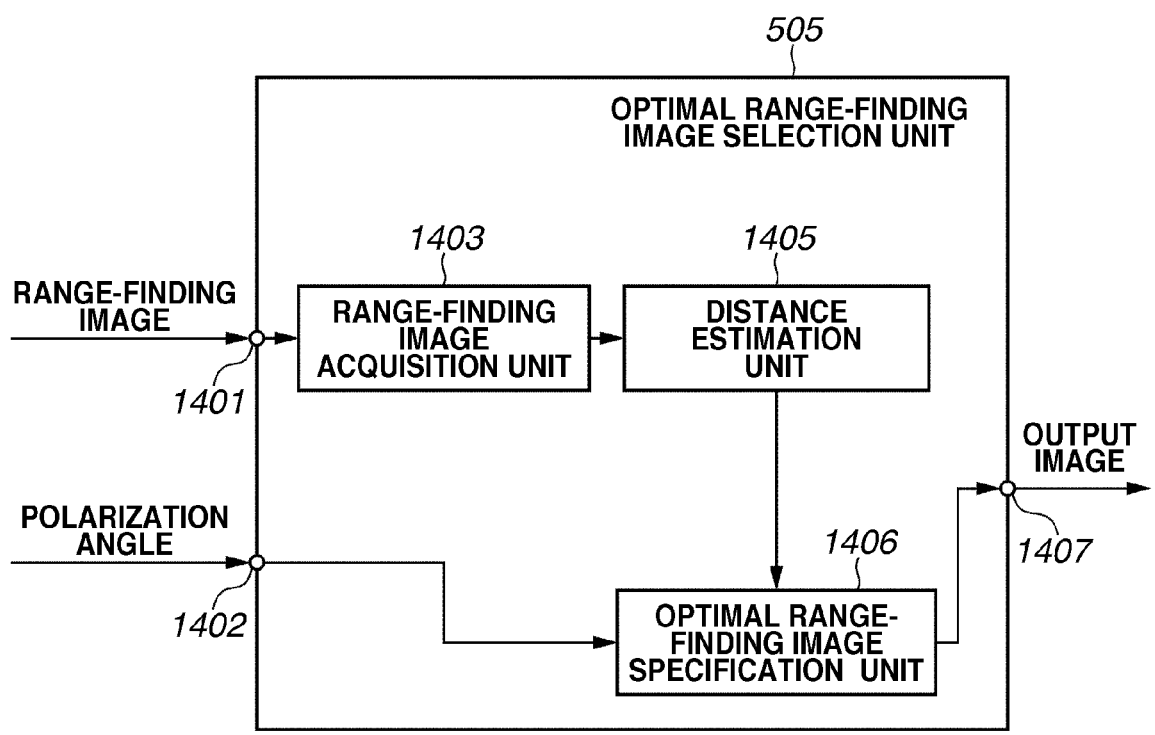
FIG. 14 illustrates an optimal range-finding image selection unit according to a third exemplary embodiment.

A third exemplary embodiment will be described. FIG. 14 is a block diagram illustrating an optimal range-finding image selection unit 505 according to the present exemplary embodiment. Range-finding image data is input to a range-finding image acquiring unit 1403 from an input terminal 1401. A distance estimation unit 1405 performs distance estimation using the range-finding image data. An optimal range-finding image specification unit 1406 specifies optimal range-finding image data using the result of the distance estimation. The optimal range-finding image data is output from an output terminal 1407.

Figure 15:
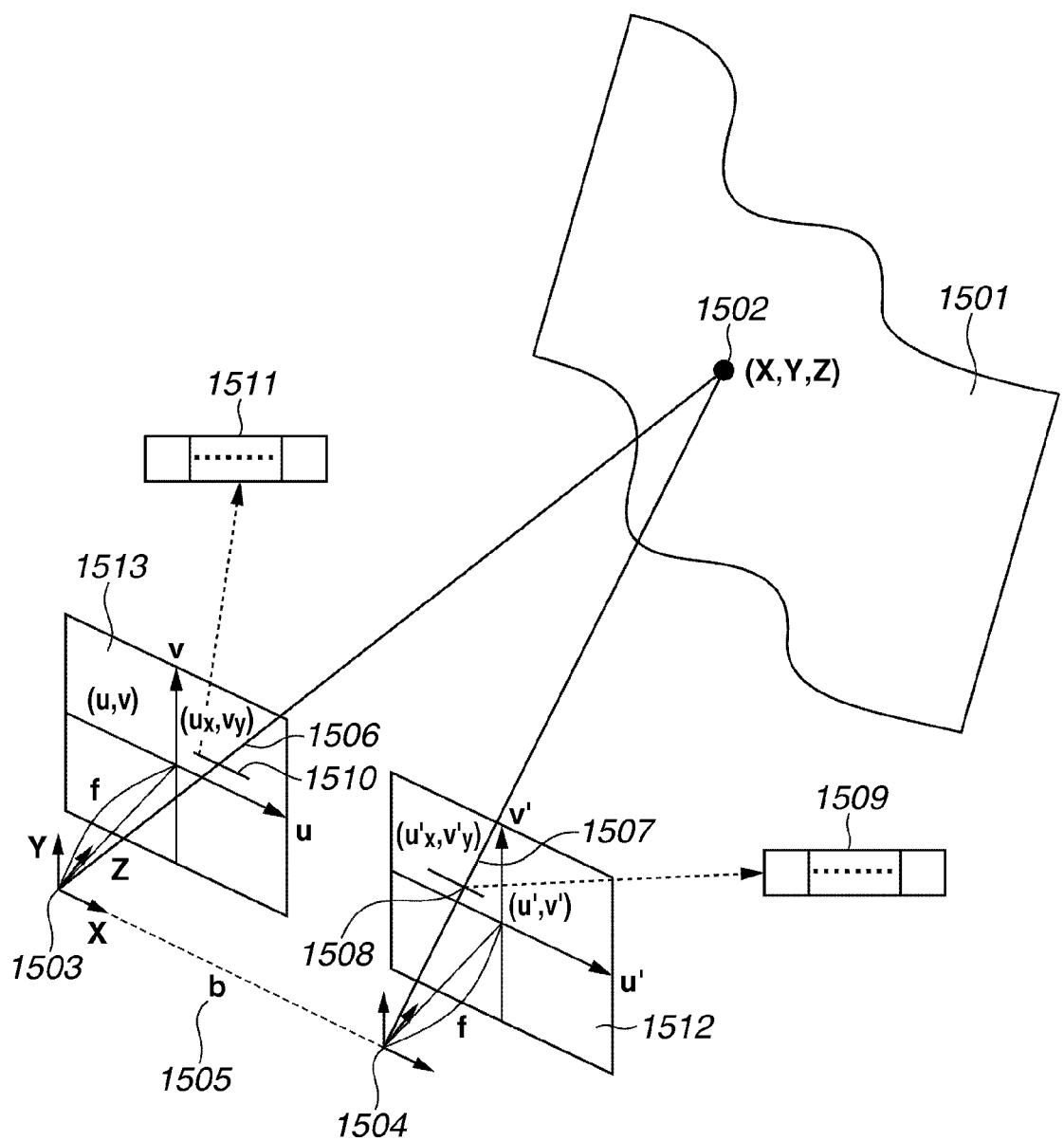
FIG. 15 illustrates a method for performing stereo distance estimation.

FIG. 15 illustrates a method in which the distance estimation unit 1405 performs stereo distance estimation. Information about a distance from the optical units to the subject is estimated based on image data acquired by at least two optical units each provided with a polarization filter having the same polarization angle.

A target point 1502 is established on a subject 1501. The surface of the subject 1501 has a wave-like shape. As for two cameras with a stereo method, performance is the same. In each camera, a light beam passing through the optical center forms an image on a projection surface. In FIG. 15, the left and right cameras have the respective optical centers 1503 and 1504, and the respective projection surfaces 1513 and 1512.

A Cartesian coordinate system whose origin is the center of the left projection surface 1513 is represented by (u, v). The line connecting the optical center 1503 and the origin of the coordinates on the projection surface 1513 intersects the projection surface 1513 perpendicularly, and the distance therebetween is a focal length f.

A Cartesian coordinate system whose origin is the center of the right projection surface 1512 is represented by (u', v'). The coordinates ($X_{camera}$, $Y_{camera}$, $Z_{camera}$) on the subject 1501 in three-dimensional space are connected to the optical centers 1503 and 1504 of the two cameras. The points at which the coordinates ($X_{camera}$, $Y_{camera}$, $Z_{camera}$) intersect the projection surfaces 1513 and 1512 serve as pixels on the left and right stereo images. In FIG. 15, the coordinates ($X_{camera}$, $Y_{camera}$, $Z_{camera}$) intersect the left and right projection surfaces 1513 and 1512 at intersection points 1506 and 1507. The intersection point 1506 has the coordinates ($u_x$, $v_y$). The coordinates of the intersection point 1507 are ($u'_x$, $v'_y$). Pixel arrays 1511 and 1509 are obtained by magnifying lines 1510 and 1508 on the left and right projection surface 1513 and 1512.

The line connecting the optical centers of two cameras is called a base line. A base line 1505 has a length b. The point 1502 ($X_{camera}$, $Y_{camera}$, $Z_{camera}$) on the subject 1501 is provided relative to the coordinate system of the left camera. At the point 1502 ($X_{camera}$, $Y_{camera}$, $Z_{camera}$), the subject 1501 has a depth Z. The value $Z_{camera}$ is calculated by a stereo method using the following equation (7).

$$Z = f \cdot \left( \frac{b}{|u_x - u'_x|} \right) \tag{7}$$

A conceptual diagram illustrating a method for selecting an optimal range-finding image based on a distance will be described. The result of distance estimation obtained for a specular reflection area on a glass located before an actual object is shorter than the distance to the actual object. Therefore, the polarization angle to be selected is the one that led to the estimation of the greatest distance from among the distances estimated from range-finding images obtained through polarization filters having different polarization angles. A range-finding image obtained through a polarization filter having this polarization angle is the optimal range-finding image data.

Figure 16A:
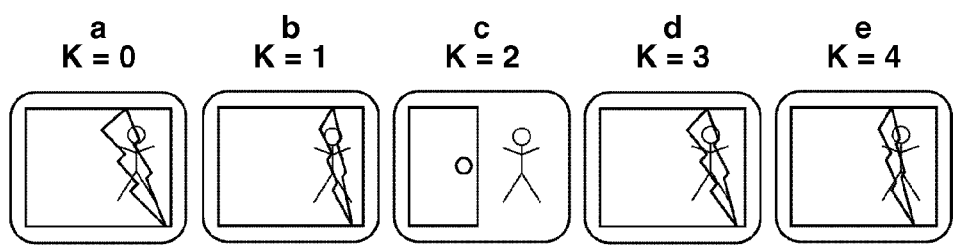
FIGS. 16A and 16B illustrate a method for selecting an optimal range-finding image according to the third exemplary embodiment.
Figure 16B:
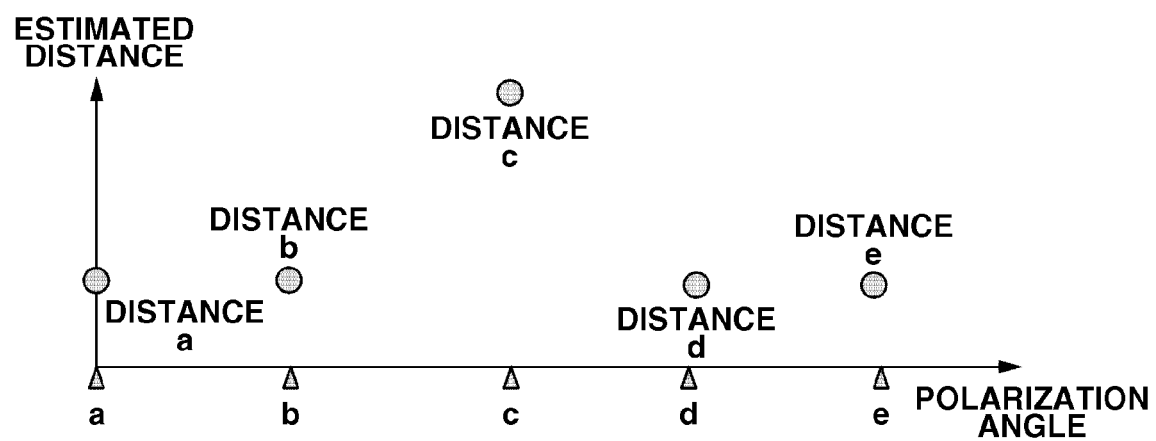

FIGS. 16A and 16B are conceptual diagrams illustrating a method for selecting optimal range-finding image data. FIG. 16A illustrates images a, b, c, d, and e acquired when the polarization angle is 0°, α°, 2α°, 3α°, and 4α°, respectively. FIG. 16B illustrates the distances to the subject obtained for the respective polarization angles. In this case, the distance estimated for the image c obtained when the polarization angle is $2\alpha°$ is the greatest. Thus, the image c is the optimal range-finding image data.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-120563 filed May 30, 2011, which is hereby incorporated by reference herein in its entirety.

What is claimed is:

1. An imaging module comprising:
   a plurality of optical units configured to form an image of a subject,
   wherein at least some of the optical units are each provided with a polarization filter;
   wherein information about a distance from the optical units to the subject is estimated based on image data acquired by at least two optical units each provided with a polarization filter having the same polarization angle, and
   wherein the plurality of optical units includes at least one optical unit provided without a polarization filter.

2. The imaging module according to claim 1, wherein the plurality of optical units includes at least:
   a first optical unit provided with a polarization filter having a first polarization angle; and
   a second optical unit provided with a polarization filter having a second polarization angle,
   wherein the first polarization angle differs from the second polarization angle.

3. The imaging module according to claim 1, wherein each optical unit provided with the polarization filter is arranged outwardly of the optical unit that is provided without the polarization filter.

4. An imaging apparatus comprising an imaging module according to claim 1.

5. An imaging processing method, comprising:
   forming an image of a subject using a plurality of optical units; and
   estimating information about a distance from the optical units to the subject based on image data acquired by at least two optical units each provided with a polarization filter having the same polarization angle,
   wherein at least some of the optical units are each provided with a polarization filter, and
   wherein the plurality of optical units includes at least one optical unit provided without a polarization filter.

* * * * *